Nov. 29, 1960

D. W. FATH ET AL 2,962,173

SELECTIVE SYSTEM

Filed March 17, 1958

INVENTORS
DOUGLAS W. FATH
CHARLES E. SMITH
BY

*Wm. A. Autio*

ATTORNEY

Nov. 29, 1960
D. W. FATH ET AL
2,962,173
SELECTIVE SYSTEM
Filed March 17, 1958
2 Sheets-Sheet 2
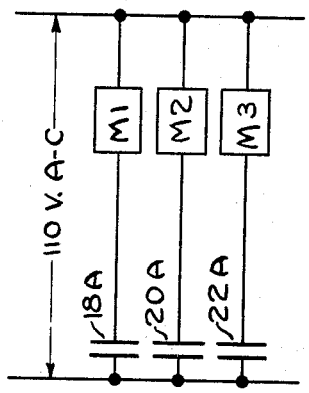
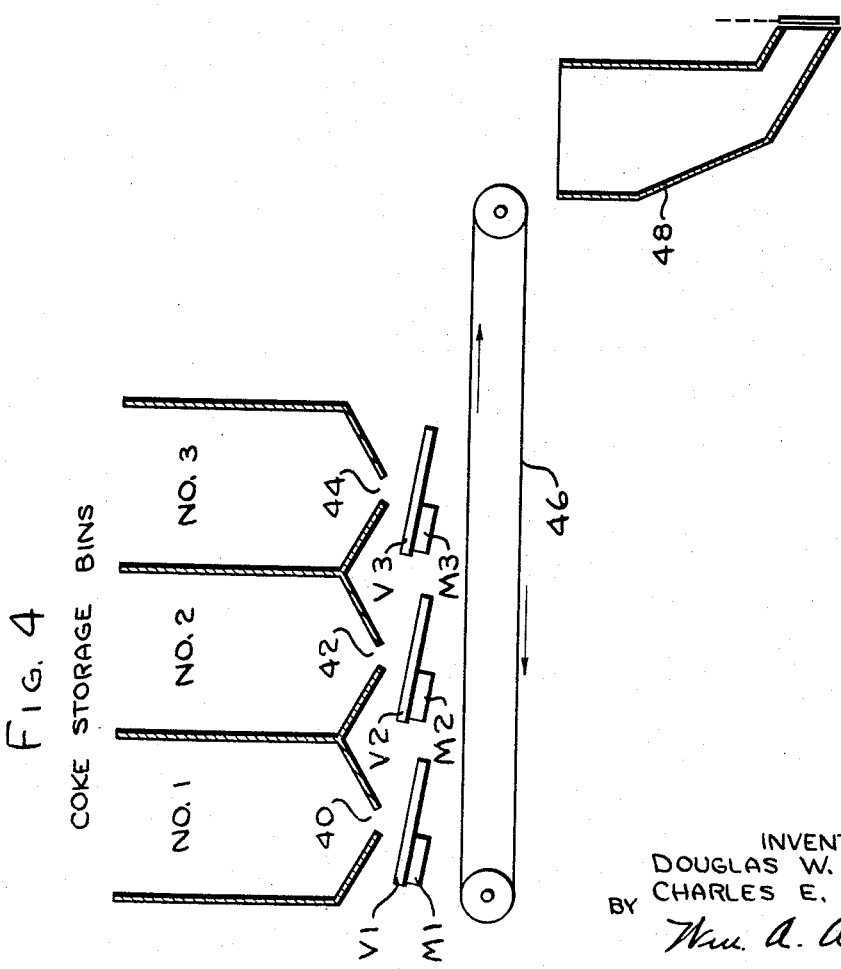
INVENTORS
DOUGLAS W. FATH
CHARLES E. SMITH
BY
*Wm. A. Autio*
ATTORNEY

United States Patent Office 2,962,173
Patented Nov. 29, 1960

2,962,173

SELECTIVE SYSTEM

Douglas W. Fath, Brookfield, and Charles E. Smith, Milwaukee, Wis., assignors to Cutler-Hammer, Inc., Milwaukee, Wis., a corporation of Delaware Filed Mar. 17, 1958, Ser. No. 721,717

8 Claims. (Cl. 214—17)

This invention relates to improvements in electrical selector systems.

In certain applications using a number of electrically operated devices, it is advantageous upon each receipt of a signal from outside the selector system to automatically select for energization a different one of such devices or as an option a different combination of such devices.

It is the object of this invention to provide an electrical selector system which performs such function accurately and efficiently.

This object is obtained by employing a selector relay for each such device, each selector relay having two or more selector relay contacts energizing such relays in succession by a stepping rotary switch controlled by the signal from outside the system, providing an operating circuit for said devices which is closed under control of a program switch, having one selector relay contact of each selector relay place one of said devices in such operating circuit, having a second selector relay contact of each such selector relay place a different one of said devices in such operating circuit, and using an optional switch to place all such second selector relay contacts in such operating circuit. Thus when the optional switch is open only one device will be in the operating circuit and the rotating switch changes the device in the operating circuit each time it steps. However, when the optional switch is closed, a combination of at least two devices will be in the operating circuit and the rotating switch will change the combination in the operating circuit each time it steps.

One application of this system is in the feeding of coke to a blast furnace. Coke is fed from three separate bins (or multiples thereof) to a weigh hopper from which it is ultimately transferred to the large bell of a blast furnace. The coke may be taken from only one bin at a time or (to speed up the operation) it may be taken from two bins at one time. In order to equalize the amount of coke remaining in each of the storage bins, this system alternates the bins from which coke is drawn one at a time or changes the combination of two bins from which coke is drawn. Discharge from each bin is effectuated by electrically energized vibrating feeders, the control of which lies in a vibrator control relay for each bin.

In the accompanying drawing:

Fig. 3 is a schematic wiring diagram of a circuit for operating the vibrator magnets through contacts of the vibrator control relays; and Fig. 4 is a schematic illustration of the coke bins, vibrators, conveyor belt mechanism and the weigh hopper.

Figure 1:
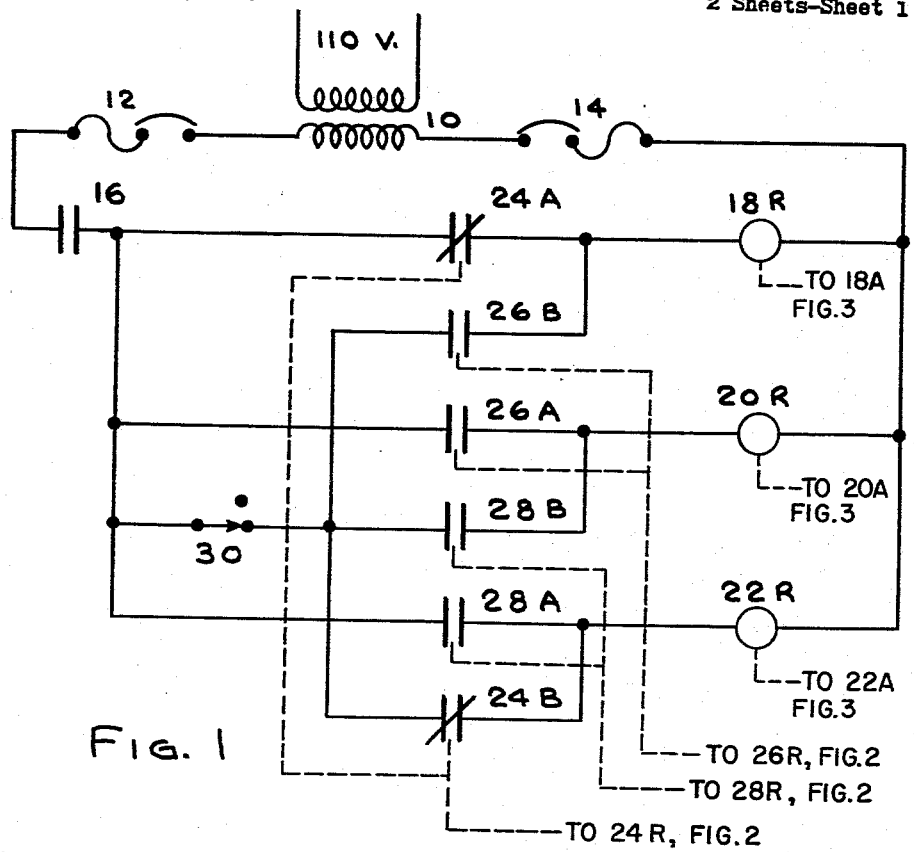
Fig. 1 is a schematic wiring diagram of an operating circuit for three vibrator control relays (sometimes referred to as electrically operated devices) including an optional switch, selector relay contacts, and program switch.

The operating circuit as shown in Fig. 1 obtains power through a transformer 10 from a 110 volt A.C. source. The circuit is guarded by the customary fuses and circuit breakers 12 and 14. The operating circuit is closed by a starter contact 16 operated by a coke charging control system relay LVR shown and described in Douglas W. Fath and Charles E. Smith copending application Serial No. 720,399, filed March 10, 1958. Connected in parallel in the operating circuit are vibrator control relays 18R, 20R, and 22R which control respectively the coke vibrating feeders V1, V2 and V3 of a first bin, a second bin, and a third bin as shown in Figs. 3 and 4. Vibrator control relays 18R, 20R and 22R are respectively set up for energization in the operating circuit by selector relay contacts 24A, 26A, and 28A which are connected to the starter contact 16. An optional switch 30 has an open or ONE position and a closed or TWO position. When closed, it connects selector relay contacts 26B, 28B and 24B to the starter contact 16. The selector relay contact 26B is connected to vibrator relay 18R. Selector relay contact 28B is connected to the vibrator relay 20R. Selector relay contact 24B is connected to vibrator relay 22R.

Figure 2:
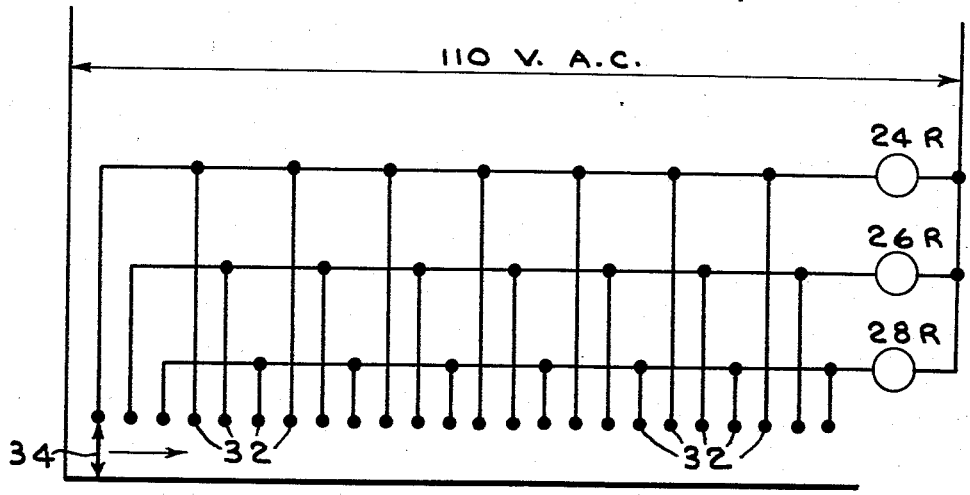
Fig. 2 is a schematic wiring diagram of the selector circuits for the selector relays and stepping rotary switch; such selector operating circuit forming a selector system embodying this invention.

The selector relay contacts are normally open and are closed by selector relays 24R, 26R and 28R in the selector circuit shown in Fig. 2. This selector circuit is energized from a 110 volt A.C. source. It includes a stepping rotary switch having twenty-four buttons 32 which are engaged in succession by a rotating switch arm 34 continually connected to one side of the source. A similarly operating rotating switch is shown and described in Douglas W. Fath and Charles E. Smith copending application Serial No. 721,718, filed March 17, 1958. The selector relays are connected to the other side of the source and to the buttons of the rotary switch as follows: selector relay 24R is connected to the first, fourth, seventh, tenth, thirteenth, sixteenth, nineteenth and twenty-second button; selector relay 26R is connected to the second, fifth, eighth, eleventh, fourteenth, seventeenth, twentieth and twenty-third button; and selector relay 28R is connected to the third, sixth, ninth, twelfth, fifteenth, eighteenth, twenty-first and twenty-fourth button. The switch arm 34 is advanced one button each time a signal is received from the limit switch controlled relay LBOR operated by the dumping of a large bell in a blast furnace charging cycle as shown in Fig. 14B of Douglas W. Fath and Charles E. Smith copending application Serial No. 720,-400 filed March 10, 1958. Thus for the first coke withdrawal the selector relay 24R will be energized. After the dumping of the large bell the selector relay 26R will be energized. After the next dump of the large bell the selector relay 28R will be energized. This cycle will repeat upon further dumping of the large bell.

With the optional switch 30 open at position ONE, only one of the vibrator control relays 18R, 20R, and 22R will be energized when the starter contact 16 is closed. However, each dumping of the large bell will change the vibrator control relay to be next energized. Hence after repeated dumpings in the charging of the blast furnace the withdrawal of coke from each bin will be substantially equal.

Referring to Fig. 3, there is shown a control circuit connected across an alternating current power supply source and having vibrator operating electromagnets M1, M2 and M3 energizable through normally open contacts 18A, 20A and 22A of vibrator control relays 18R, 20R and 22R, respectively. As shown in Fig. 4, each magnet M1, M2 and M3 is arranged to operate an associated vibrator member V1, V2 and V3, respectively, the latter being positioned below openings 40, 42 and 44 in the lower portions of coke storage bins No. 1, No. 2 and No. 3, respectively. A coke conveyor belt 46 is positioned below the vibrators to receive the coke withdrawn from the storage bins and to convey the same to a weigh hopper 48.

With switch 30 in its open position and the stepping switch of Fig. 2 in the first position, closure of starter contact 16 causes energization of relay 18R. Contact 18A closes to energize magnet M1. Normally the coke in the storage bin jams the opening. Energization of magnet M1 causes operation of vibrator member V1 to withdraw coke from bin No. 1 onto conveyor belt 46 and the latter conveys the same to weigh hopper 48. Each time the large bell is dumped, switch arm 34 of the stepping switch of Fig. 2 is stepped to the next position. Thus, vibrator control relays 18R, 20R and 22R are energized in sequence and close their contacts 18A, 20A and 22A in Fig. 3 to cause sequential withdrawal of coke from the storage bins whereafter the cycle is repeated thereby to equalize the amount of coke drawn from each storage bin.

With the optional switch 30 closed at position TWO, as shown, the selector relay contacts 26B, 28B and 24B are placed in the operating circuit. Thus when selector relays 24R, 26R, and 28R are energized in succession the following combinations of vibrator relays will be set for energization in succession: 18R and 22R; 18R and 20R; and 20R and 22R. Thus after repeated dumpings in the charging of the blast furnace by withdrawal from two bins at a time the withdrawl from all three bins will be substantially equal. With switch 30 in its closed position and the stepping switch in the first position, closure of starter contact 16 causes energization of control relays 18R and 22R. As a result, contacts 18A and 22A in Fig. 3 close to energize magnets M1 and M3 and to operate vibrators V1 and V3. Coke is drawn from bins No. 1 and No. 3 onto the conveyor belt. When switch arm 34 is stepped to the second position, selector relay 24R is deenergized to open contacts 24A and 24B and selector relay 26R is energized to close contacts 26A and 26B. The next closure of starter contact 16 causes energization of vibrator control relays 18R and 20R which in turn energize magnets M1 and M2 to withdraw coke from bins No. 1 and No. 2. It will be apparent that in the third position of the stepping switch, selector relay 28R is energized and closure of contact 16 causes withdrawal of coke from bins No. 2 and No. 3 whereafter the cycle is repeated to equalize the amount of coke withdrawn from the storage bins.

We claim:

1. An electrical selector system for a number of electrically operated devices comprising a source of electrical power, a first group of parallel circuits connected to said source each having in series therein an electrically operated device and selector relay contact, a second group of parallel circuits having selector relay contacts therein, an optional switch for connecting one end of said second group to one side of said source, each of the other ends of the circuits in said second group being connected to one of said devices, a selector control circuit having selector relays, and switch means responsive to a signal outside said system for energizing said selector relays in succession, each one of said selector relays operating a selector relay contact in said first group of circuits and a selector relay contact in said second group of circuits.

2. An electrical selector system as set forth in claim 1 in which the selector relay contact in each circuit of said first group is controlled by a different selector relay than that which controls the selector relay contact in each corresponding circuit of said second group connected with the same device.

3. An electrical selector system for feeding coke from at least three storage bins while equalizing the amount of coke in each bin comprising, a source of electrical energy, a vibrator control relay for each bin operable when energized from said source to control the withdrawal of coke from said bin, a single bin selector relay contact for each vibrator control relay to energize said relay when closed, a selector relay associated with each vibrator control relay to close said selector relay contact, and switching means controlled by a signal outside the system each time a large bell for charging a blast furnace is dumped to energize in succession said selector relays.

4. An electrical selector system as set forth in claim 3, together with dual bin selector relay contacts one for each vibrator control relay, the dual bin selector relay contact for one vibrator control relay being operated by a selector relay other than the selector relay associated with such vibrator control relay.

5. In a control system for withdrawing coke from selective combinations of at least three storage bins to equalize the amount of coke drawn from each bin, an electrical power supply source, a vibrator control relay for each bin operable when energized from said source to control the withdrawal of coke from the associated bin, a plurality of bin selector relays, a stepping switch operable by an external signal for energizing said bin selector relays in sequential cycles and for maintaining energization of one of said bin selector relays in a given position thereof, said vibrator control relays being connected to one side of said source, each bin selector relay having a first contact between one vibrator control relay and the other side of said source forming a first group of contacts and a second contact between another vibrator control relay and said other side of said source forming a second group of contacts, and a manually operable switch for connecting the contacts of said second group in parallel with respective contacts of said first group to enable each bin selector relay to control operation of a different pair of said vibrator control relays.

6. The invention defined in claim 5, together with a normally open starter contact for connecting said two groups of bin selector relay contacts to said other side of said source to energize the selected vibrator control relays.

7. In a selector system for controlling the energization of predetermined combinations of a plurality of electroresponsive devices, in combination, an electrical power supply source, a plurality of selector devices, a stepping device for energizing said selector devices in succession across said source in response to successive stepping signals received from an outside source, a plurality of electroresponsive devices, each said selector device having at least two circuit control devices operable upon energization thereof for controlling energization of a pair of said electroresponsive devices across said source, and the two circuit control devices of each selector device being connected to control energization of a different pair of said electroresponsive devices whereby to control energization of said electroresponsive devices in predetermined combinations.

8. The invention defined in claim 7, together with a manually operable switch for rendering a circuit control device of each said selector device ineffective.

References Cited in the file of this patent
UNITED STATES PATENTS

| | | |
|---|---|---|
| 1,801,502 | Harwood | Apr. 21, 1931 |
| 2,314,906 | Stahl | Mar. 10, 1943 |
| 2,852,728 | Samson | Sept. 16, 1958 |